US008098258B2

(12) United States Patent
Burley et al.

(10) Patent No.: US 8,098,258 B2
(45) Date of Patent: Jan. 17, 2012

(54) METHODS AND APPARATUS FOR MULTIPLE TEXTURE MAP STORAGE AND FILTERING

(75) Inventors: Brent D. Burley, Monterey Park, CA (US); J. Dylan Lacewell, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 734 days.

(21) Appl. No.: 12/176,278

(22) Filed: Jul. 18, 2008

(65) Prior Publication Data
US 2009/0021522 A1    Jan. 22, 2009

Related U.S. Application Data

(60) Provisional application No. 60/961,363, filed on Jul. 19, 2007.

(51) Int. Cl.
G06K 9/40 (2006.01)
G06K 9/36 (2006.01)
G06K 9/60 (2006.01)
G06T 11/40 (2006.01)
G06T 17/00 (2006.01)
G06F 15/00 (2006.01)
G09G 5/00 (2006.01)

(52) U.S. Cl. ........ 345/582; 345/428; 345/589; 345/501; 345/552; 382/254; 382/274; 382/285; 382/305

(58) Field of Classification Search .......... 345/418–420, 345/428, 581–582, 587, 589, 606, 618, 501, 345/520, 549, 552; 707/705, 754; 382/254, 382/274, 276, 285, 293, 305
See application file for complete search history.

(56) References Cited

U.S. PATENT DOCUMENTS

| 5,734,386 | A | 3/1998 | Cosman |
| 6,078,331 | A | 6/2000 | Pulli et al. |
| 6,469,701 | B1 | 10/2002 | Gumhold |
| 6,744,438 | B1 * | 6/2004 | Baldwin ........................ 345/552 |
| 2002/0063707 | A1 | 5/2002 | Kawanaka |
| 2003/0172108 | A1 * | 9/2003 | Paul et al. ..................... 709/203 |
| 2008/0007567 | A1 * | 1/2008 | Clatworthy et al. .......... 345/619 |

OTHER PUBLICATIONS

Burley, Brent et al., "Ptex: Per-Face Texture Mapping for Production Rendering", *Proceedings of the Eurographics Symposium on Rendering 2008*, pp. 1155-1164 (2008).
International Search Report PCT/US08/70501 dated Oct. 22, 2008.

* cited by examiner

*Primary Examiner* — Wesner Sajous
(74) *Attorney, Agent, or Firm* — Kilpatrick Townsend & Stockton LLP (57) ABSTRACT

A method for a computer system including receiving a file comprising textures including a first and a second texture, and metadata, wherein the first texture need not have a predetermined geometric relationship to the second texture, wherein the metadata includes identifiers associated with textures and includes adjacency data, associating the first texture with a first location on an object in response to an identifier associated with the first texture, associating the second texture with a second location on the object in response to an identifier associated with the second texture, determining an edge of the first texture is adjacent to an edge of the second texture in response to the adjacency data, and performing a rendering operation with respect to the first and the second surface on the object to determine rendering data in response to the first texture and to the second texture.

25 Claims, 6 Drawing Sheets

METHODS AND APPARATUS FOR MULTIPLE TEXTURE MAP STORAGE AND FILTERING

CROSS-REFERENCE TO RELATED APPLICATIONS

This application claims the benefit of U.S. Provisional Application No. 60/961,363, filed Jul. 19, 2007, entitled "Per-Face Texture Mapping," which disclosure is incorporated herein by reference for all purposes.

BACKGROUND OF THE INVENTION

The present invention relates to computer generated imagery, e.g. computer animation. More specifically, the present invention relates to methods and apparatus for providing texture maps to surfaces with increased efficiency and increased quality.

The inventors of the present invention have previously utilized a computer animation pipeline for modeling elements for computer animation. Many of these elements have been modeled using Catmull-Clark subdivision surfaces and shaded using general-purpose shaders with multiple layers (e.g. a dozen or more) of attributes such as color and displacement. These attributes are typically controlled by texture maps that have been created using a combination of procedural generation methods and hand-painting methods.

The inventors of the present invention recognize that using texture maps based upon procedurally-generated textures generally provide faster and more predictable rendering times. Further, procedurally-generated textures often produce lower filtering and anti-aliasing artifacts. However, purely procedural shaders are often computationally expensive, difficult to art direct, and are often difficult to anti-alias. Accordingly, the inventors have determined that various embodiments of computer animation pipelines should be parameterized for painting.

The inventors recognize that many parameterization methods for an animation pipeline have been contemplated, but few of them have considered the impact of pre-processing on a production pipeline. For example, a pipeline with manual intervention (e.g., manual adjusting of seam placement) is time consuming for the user. As another example, a fully automatic pipeline is also time consuming, as parameterizing a mesh introduces an extra dependency in an animation pipeline in-between modeling and painting/rendering.

Figure 1A:
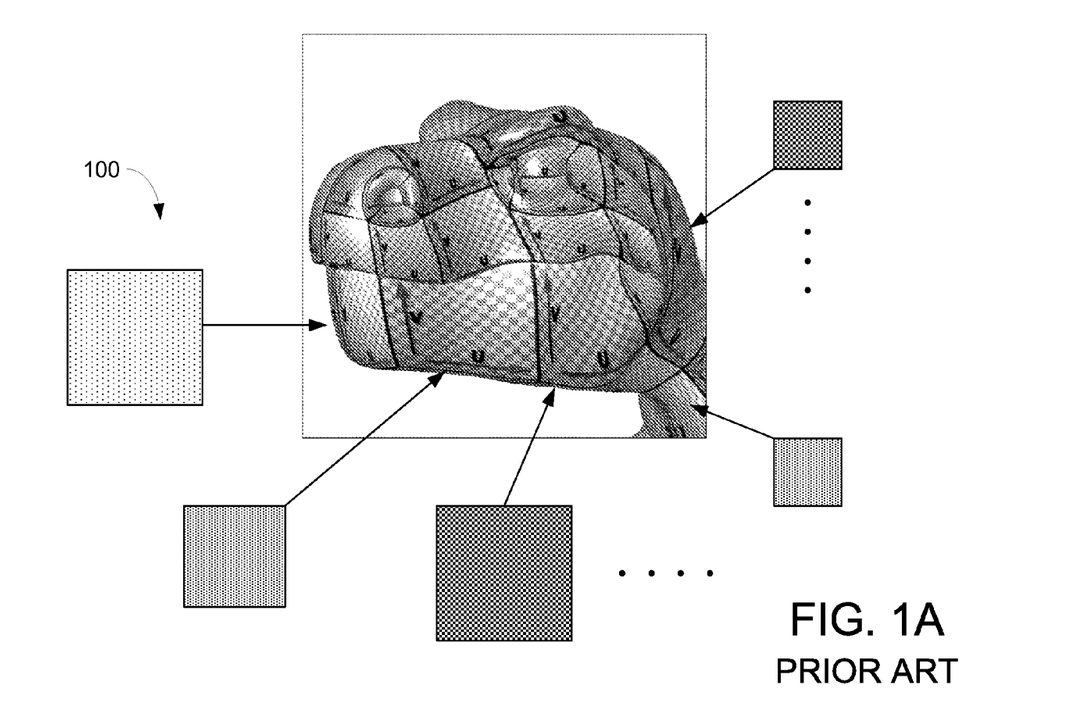
FIGS. 1A-B illustrate examples of problems with the prior art.

The inventors have previously implemented texture mapping pipelines based upon decomposing subdivision surfaces into rectangular groups of faces which are termed "patches." Using conventional techniques, texture maps 100 are mapped from texture map coordinates of (s, t) to each of the patches, using surface coordinates (u, v). An example of this mapping is illustrated in FIG. 1A. Such embodiments have been considered robust but resource intensive. For example, because each patch has required a separate texture file 100, often a large number of separate texture files are required for each surface. In light of this, within a scene, the I/O (input/output) cost of accessing, for example 1,000,000 separate texture files, is considered by the inventors as very time consuming. Additionally, other per-patch runtime costs in tools for processing the patches (layout and animation tools, painting tools, RIB generators, etc.) also reduce performance. An additional drawback includes that patches must be generated for a mesh before it can be painted or rendered with full shading.

Figure 1B:
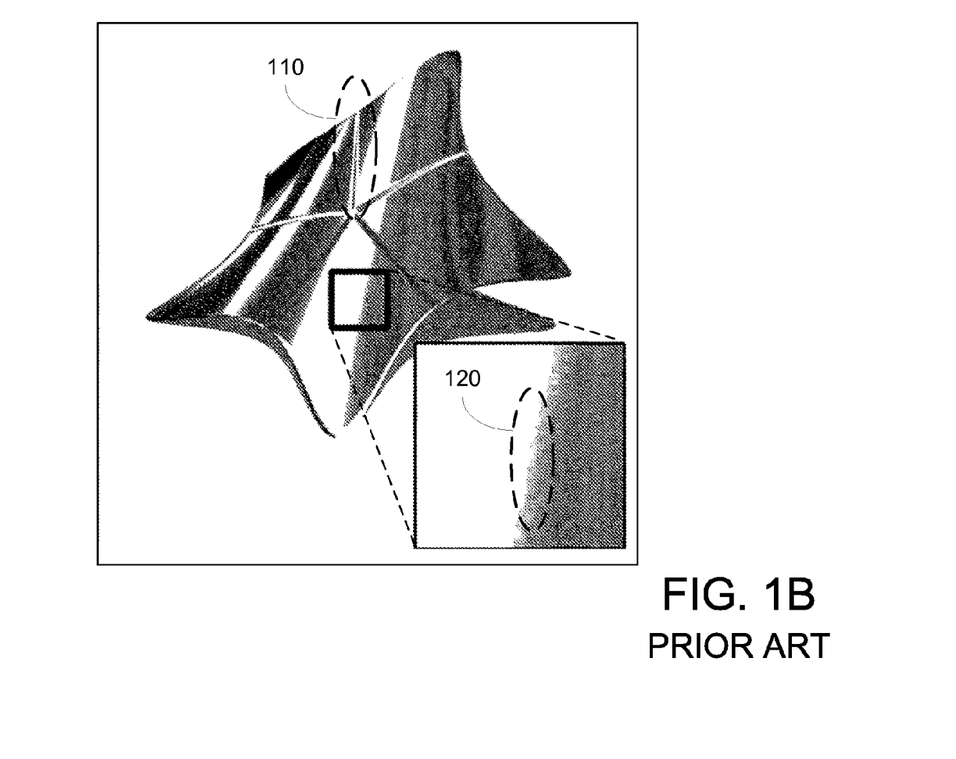

Other drawbacks determined by the inventors include that such pipelines often produce visual artifacts due to clamping at patch boundaries. Such artifacts are often visible when smooth displacement maps are applied to a surface with a strong specular or reflective response. An example of this is illustrated in FIG. 1B where a surface is rendered with five patches. In FIG. 1B, patch seams 110 are illustrated by the star-like pattern emanating from the center of the surface. Some work-arounds for such artifacts have included: limiting how users can define smooth features of an object, by modeling smooth features into the base surface rather than using displacement maps; by adding noise to displacement maps (if appropriate to the look); and/or by using normal maps in addition to, or instead of displacement maps. Such limitations undesirably restrict the creativity and flexibility of the artists who are charged with producing the computer generated imagery.

The inventors have considered a number of alternative ways to address the issues described above. However, many alternatives do not consider the high quality filtering needs of production rendering, and many do not improve efficiency, and/or reduce pipeline efficiency.

Once set of techniques utilize planar domains. In such techniques, parameterization methods flatten the entire mesh onto a plane and use the planar coordinates as texture coordinates. However, unless the mesh has genus 0 (is disk-like), unfolding the mesh requires one or more cuts. This results in visible seam artifacts when filtering across cuts, which map to discontinuous boundaries in texture space. One technique places cuts in areas of high curvature and occlusion. Another technique places cuts in areas of high curvature and stores sideband data, which allows stitching of the boundary for seamless rendering. Such techniques, however do not provide a solution for prefiltering of mipmaps, or the like.

Distortion is also an issue with the methods above. To reduce distortion, the mesh can be decomposed into multiple patches which are separately flattened onto charts and packed into a texture atlas. A drawback to this is that packing wastes texture space, and seams still are apparent when adjacent patches map to non-adjacent charts. In some methods, to hide seams, a small gutter around rectangular charts are provided at each mipmap level. Additionally, the texture coordinates are adjusted so that a trilinear filter never spans a gutter. All of these additional techniques, however, undesirably increase the processing time.

Another set of techniques utilize spherical and/or other domains. In such techniques, instead of mapping a mesh to a plane, the mesh is mapped to a sphere, or the like. Seamless, low-distortion mapping to a sphere were proposed for genus 1 meshes, and a generalization of spherical mapping was proposed for arbitrary meshes. Such techniques sometimes distribute texture area very non-uniformly. In the case of PolyCube maps, textures are stored on multiple cubes which roughly approximate the mesh. However, PolyCube maps have been asserted to be not practical for very complex meshes, as is common found with state-of the art computer generated imagery.

Another set of techniques rely upon projection mapping, and does not require assigned UVs. In such techniques, texture values are looked up with a projection onto a plane or other parametric surface. A depth map is then used to prevent texture values from projecting through geometry. The inventors believe that such techniques may work well for more simple objects and would not obviate the need for a patch creation step in a rendering pipeline. However, there may be an increase in cost in painting and rendering of an element.

Additional possible drawbacks includes that multiple projections may be required to cover complex geometry, and that blending between projections may require some amount of overpainting and undesirable manual intervention to remove artifacts. Other possible drawbacks include that additional texture space and additional texture lookups may be required. This is because additionally multiple perspective matrix transforms, depth map and color map lookups may be necessary per shading point.

Yet another set of techniques rely upon volumetric textures. In such examples, texture values can be stored in a volumetric data structure such as a 3d grid, an octree, or a Brick map. Grids, however, require a large amount of storage; and adaptive, tree-based structures, such brick maps also require much more storage than 2D textures. Other drawbacks include a logarithmic time for lookups; filtering issues with volumetric data, since filtering is linear and takes place in three-dimensions rather than on a surface; and colors can bleed through nearby surfaces (e.g., clothes and skin), so those surfaces have to be stored in separate maps.

In light of the above, techniques for providing texture maps to surfaces with increased efficiency and increased quality are desired.

SUMMARY OF THE INVENTION

The present invention relates to computer generated imagery. More specifically, the present invention relates to methods and apparatus for texture mapping of surfaces with increased efficiency and increased quality. In various embodiments of the present invention, texturing methods retain the advantages of patch-based texturing (generality, ease of painting) while overcoming its drawbacks (patch assignment step, high cost of disk I/O, displacement filtering artifacts).

In various embodiments, the inventors realized that traditional two dimensional texture files and filters impose unnecessary constraints, and that multiple textures may be stored along with metadata, e.g. adjacency data, face identifiers, in fewer (e.g. one) files. Accordingly, filtering across the boundaries could easily be performed. Such embodiments reduce or remove filtering seams, and reduce the cost of disk I/O, since the number of texture files could be greatly reduced (e.g. one custom texture file or texture data file). Additionally, various embodiments support, seamless filtering, thus making it feasible to assign a separate texture to every face, and thus eliminating pipeline steps for segmenting the mesh into patches.

In various embodiments of the present invention, a texture mapping system for subdivision surfaces is described that reduces or does not require assigned texture coordinates. This simplifies the production pipeline for computer generated imagery, such as with three-dimensional computer animated features, or the like. As will be described below, faces of a control mesh are given respective textures using intrinsic face parameterizations. Further, the textures may be stored in a single file per mesh. In various implementations, mesh connectivity information can be stored in the header of the texture file. This feature enables filtering across face texture boundaries with reduced visibility or invisible seams, even for smooth displacement maps. Such features are believed to provide marked improvement over existing filtering methods. Experimental results are provided to demonstrate that various embodiments provide enhanced performance, enhanced texture quality, and significant data I/O improvements.

In various embodiments, new texture mapping methods are disclosed which use the intrinsic per-face parameterization of a mesh in which each face maps onto a unit square Accordingly, no preprocessing is required to assign texture coordinates. Various embodiments also reduce I/O costs of accessing texture files during rendering, by including multiple texture files in a single file. Various embodiments, also greatly reduce or eliminate visible seams during rendering processes, even for displacement maps, which are particularly difficult to filter.

In one embodiment, an example of custom file format, called a Ptex (short for per-face texturing) is discussed. Instead of packing textures into an atlas, a Ptex file stores all the face textures in a linear array, along with a separate table, indexed by a "faceid," that gives the texture dimensions and an offset into the array. Additionally, face adjacency data is stored compactly in the Ptex file.

In various embodiments, a Mitchell filter [Mitchell and Netravali 1988] is used in a rendering pipeline that provides a sharpness control making it suitable for both sharp color mapping and smooth displacement filtering. Filtering entirely within a face proved straightforward, and seamless filtering across face boundaries is described in detail below. In various embodiments, control meshes, or meshes may be implemented as Catmull-Clark subdivision control meshes. In some embodiments, meshes are made of quads, or faces.

According to one aspect of the invention, a method is described. One technique includes receiving a data file comprising a plurality of texture maps including a first texture map and a second texture map and also including metadata. The metadata includes identifiers associated with each of the plurality of texture maps and also includes adjacency data that specifies topological adjacency relationships between different ones of the texture maps. (For example, the adjacency data can specify, for a particular texture map, which edge of which texture map is adjacent to each edge of the particular texture map.) A process may include associating the first texture map with a first surface location on an object in the memory in response to an identifier associated with the first texture map, and associating the second texture map with a second surface location on the object in the memory in response to an identifier associated with the second texture map. Operations may include determining an edge of the first texture map is adjacent to an edge of the second texture map in memory in response to the adjacency data, and performing a rendering operation with respect to the first surface location and the second surface location on the object to determine rendering data in response to the first texture map and to the second texture map.

According to another aspect of the invention, a computer system is described. One apparatus includes a disk memory configured to store a data file comprising a plurality of texture maps including a first texture map and a second texture map, and metadata, wherein the first texture map need not have a predetermined geometric relationship to the second texture map in the data file, wherein the metadata includes identifiers associated with each of the plurality of texture maps and includes adjacency data. A device may include a random access memory, and a processor coupled to the disk memory and to the random access memory, wherein the processor is configured to determine an association of the first texture map with a first surface location on an object in response to an identifier associated with the first texture map, wherein the processor is configured to determine an association of the second texture map with a second surface location on the object in response to an identifier associated with the second texture map, wherein the processor is configured to determine an edge of the first texture map is adjacent to an edge of the second texture map in response to the adjacency data, and wherein the processor is configured to performing a rendering operation with respect to the first surface location and the second surface location on the object to determine rendering data in response to the first texture map, to the second texture map. In various systems, the random access memory is configured to store the association of the first texture map with the first surface location and is configured to store the association of the second texture map with the second surface location on the object in response to an identifier associated with the second texture map.

According to another aspect of the invention, a method is described. One technique includes receiving a plurality of texture maps, and receiving a plurality of face identifiers, wherein each face identifier is associated with a surface location on an object, and wherein each face identifier is associated with a texture map from the plurality of texture maps. A process may include receiving texture adjacency data and determining a per-face texture file in response to the plurality of texture maps, the plurality of identifiers, and the texture adjacency data in a data file. An operation may include storing the per-face texture file in memory. In various processes, the texture adjacency data specifies two or more texture maps from the plurality of texture maps that are adjacent, and the texture adjacency data specifies which edges of the two or more texture maps are adjacent.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Various embodiments for per-face texture mapping are described herein. In some embodiments, textures are directly mapped to surfaces of objects without the need for mathematically mapping (u, v) coordinates of the texture maps to the (s, t) coordinates of surface. In various embodiments, texture maps are associated with a surface of an object and are stored within a single texture file. In other embodiments, more than one texture file may be used. In various embodiments, the texture maps are identified within the single texture file by a parameters such as {faceid, u, v}, where faceid is a given identifier for the relevant face. In this example, parameters u and v provide the appropriate mapping of the texture within the relevant face of the surface.

Further description of certain embodiments of per-face texture mapping can be found in a paper by the inventors of the present application, "Ptex: Per-Face Texture Mapping for Production Rendering," *Proceedings of the Eurographics Symposium on Rendering* 2008, pp. 1155-1164 (2008) ("the Ptex Paper"). The Ptex Paper is incorporated herein by reference in its entirety for all purposes.

Figure 2A:
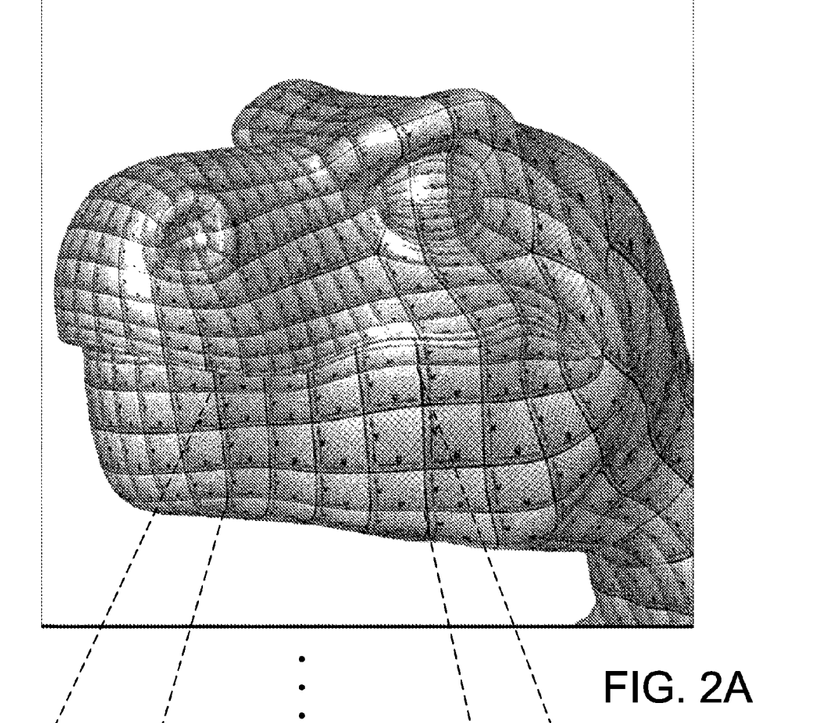
FIGS. 2A-C illustrate examples of embodiments of the present invention.
Figure 2B:
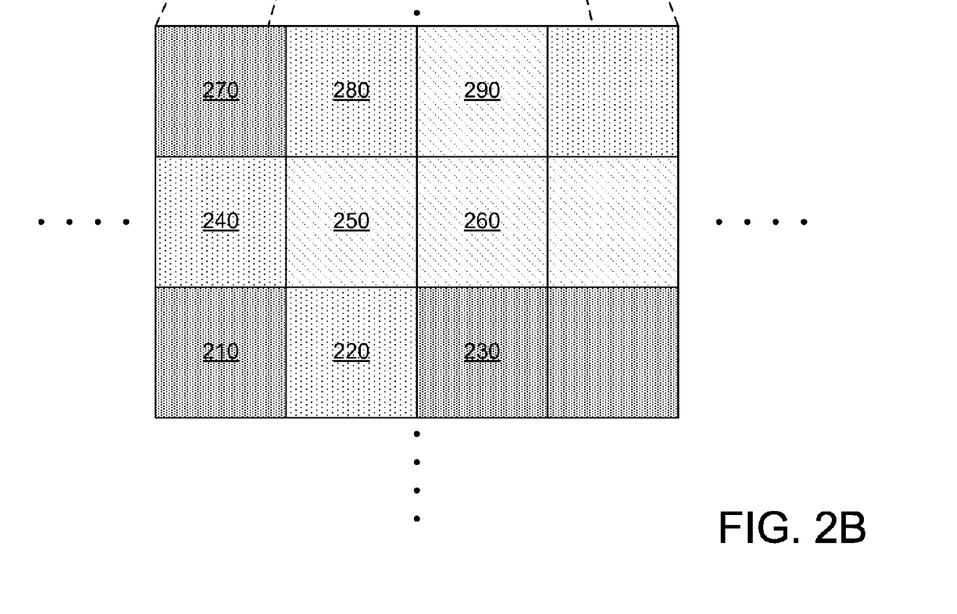

In FIG. 2A, a surface is illustrated 200 having a number of faces. In various examples, each face may be embodied as a quadrilateral, however, in other embodiments, other shapes, e.g. triangles, hexagons, or other polygons, may be used. As can be seen in this example, each face 200 is associated with a respective texture map (as can be seen via the (u, v) texture parameters). FIG. 2B includes an example of adjacent faces as identified by face identifiers. For example, face id 250 is below face id 280, is to the right of face id 240, is to the left of face id 260, and is above face id 220.

Figure 2C:
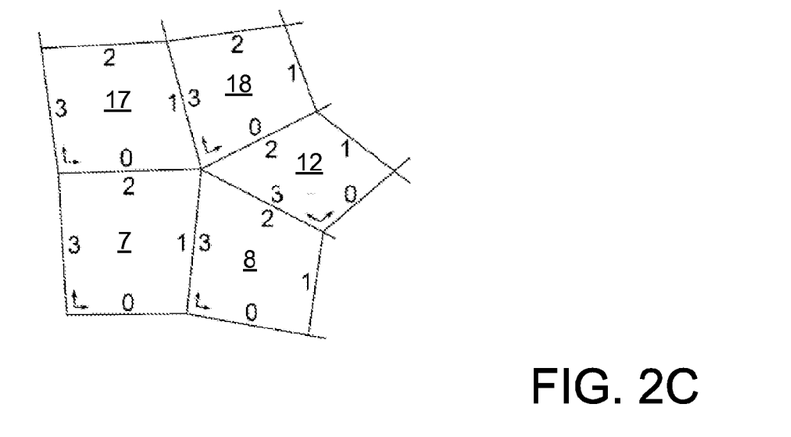

FIGS. 2B-C illustrate examples according to various embodiments. In some embodiments, texture maps are stored sequentially in the texture file, however, textures, including adjacent textures need not have a fixed or predetermined location within the texture file or geometric relationship within the texture file. In addition to the texture maps, additional data (e.g. metadata) may be stored in the texture file. In various embodiments, face identifiers (faceids) are given for each texture map. In some embodiments, these faceids are used to associate texture maps to appropriate surface faces on an object. Other metadata that may be stored in the texture file may include adjacency information for the texture maps. In other words, how the texture files are oriented with respect to each other in memory for rendering purposes.

In various examples, to provide the in-memory adjacency information, each side or edge of a texture map has a defined ordering: bottom=0, right=1, top=2, left=3, although any other ordering may be used. In various embodiments, for each face, each side or edge is associated with two parameters: the faceid of the adjacent face, and which edge of the adjacent face touches the face. In the example of FIG. 2B, for example, for faceid=250, the bottom edge (0) is adjacent to edge (2) of faceid=220. In such a case, the texture file may specify faceid=250 {0,{220,1}. As another example, the right edge (1) of faceid=250 is adjacent to edge (3) of faceid=260. In such a case, the texture file may specify, faceid=250 {1, {260,3}}. In some embodiments, adjacency information may be provided for diagonal edges, if desired.

The example in FIG. 2C illustrates that faces may be specified to be adjacent in a number of ways. As an example, the "left" edge (3) of faceid=12 is adjacent to the top edge (2) of faceid=8. More specifically, faceid=12 {3, {faceid=8,2}}. In various embodiments, other ways to specify adjacency information can be used. As examples, for faceid=7, adjacency information may be specified as: {adjfaces[−1, 8, 17, −1], adjedges[(0), 3, 0, (0)], where the ordering of the adjacency information is implicitly: the bottom face, the right face, the top face, and the left face. In this embodiment, if an adjacent face is at the edge of a mesh or boundary, the faceid is set to −1, thus, the bottom 0 and left edges 3 of faceid=7 are on such a boundary, thus the first and last values are set to −1. In this example, the face adjacency information states that the right edge 1 and the top edge 2 of faceid=7 are adjacent to faces 8 and 17, respectively. In this embodiment, if the adjacent face is at the edge or a mesh boundary, the adjacent edge is defined as (0). Accordingly, the bottom 0 and left edges of face=7 are at an edge, thus the first and last values are set to (0). Further, the edge adjacency data indicates that the right side 3 of face 8 is adjacent to edge 1 of face 7, and the bottom side 0 of face 17 is adjacent to edge 2 of face 7. In one specific example, for a single texture (faceid=25) that wraps around a cylinder, the adjacency information may be specified as: {adjfaces:[−1, 25,−1,25], adjudges[(0),3,(0),2]. In still other embodiments, other ways to indicate such adjacency information may be provided, for example, in a separate file from the texture file, or the like.

In various embodiments, based upon the in-memory adjacency information, when filtering is required for a face, the textures for adjacent faces in the defined orientation are then used. Continuing the example above, if filtering across edge 2 of face 12, in memory, the texture assigned faceid 18 is retrieved and rotated such that the bottom edge 0 abuts or is adjacent to edge 2 of face 12. Because filtering is continuous over texture map boundaries, artifacts described in the prior art are greatly reduced.

Figure 3:
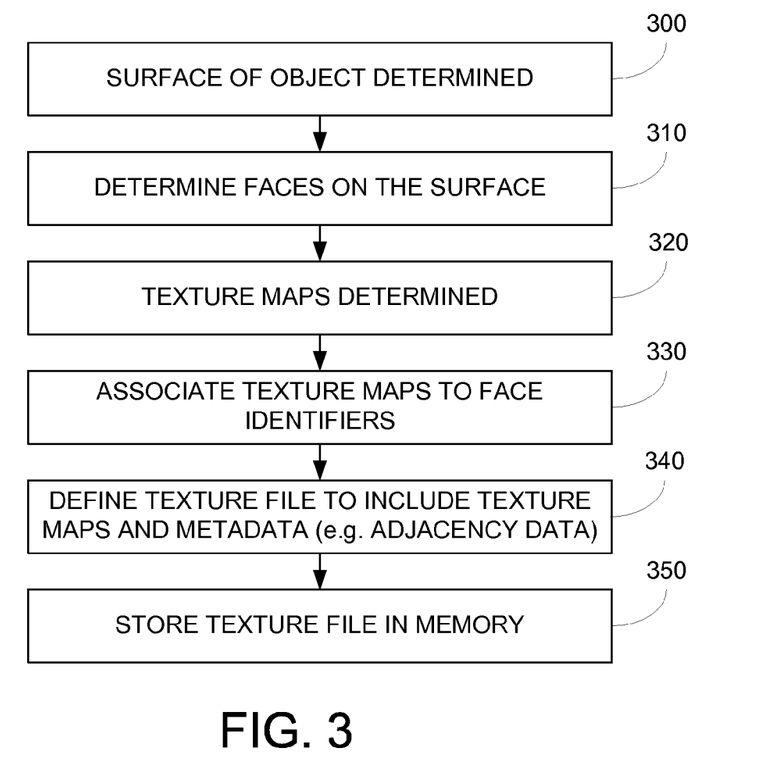
FIG. 3 illustrates a flow diagram according to various embodiments of the present invention.

FIG. 3 illustrates a flow diagram according to various embodiments of the present invention. More specifically, FIG. 3 illustrates the process of forming a texture file having the features described above. Initially, a surface of an object is determined, step 300. In various embodiments, this may be performed by performing a preliminary rendering of the object. Next, in various embodiments, the individual faces on the surface of the object are determined, step 310. In some embodiments, each face may be assigned a face identification number, and the adjacency information for each face may also be determined.

Using any number of techniques, texture maps may be specified, step 320. In various examples, a texture may be scanned or digitized, electronically created, "painted" via 2D painting, or the like. Next, based upon the texture maps, each texture map is associated with a face identifier, step 330. In various embodiments, the texture file is then created, step 340 to include the texture maps and meta data such as the association of the texture maps to face identifier, and adjacency information for each face identifier. In various embodiments, the texture maps are stored in a linear array. The texture file may then be stored, step 350, for later use during rendering. Further details and examples pertaining to creation of texture files can be found in the Ptex Paper.

Figure 4:
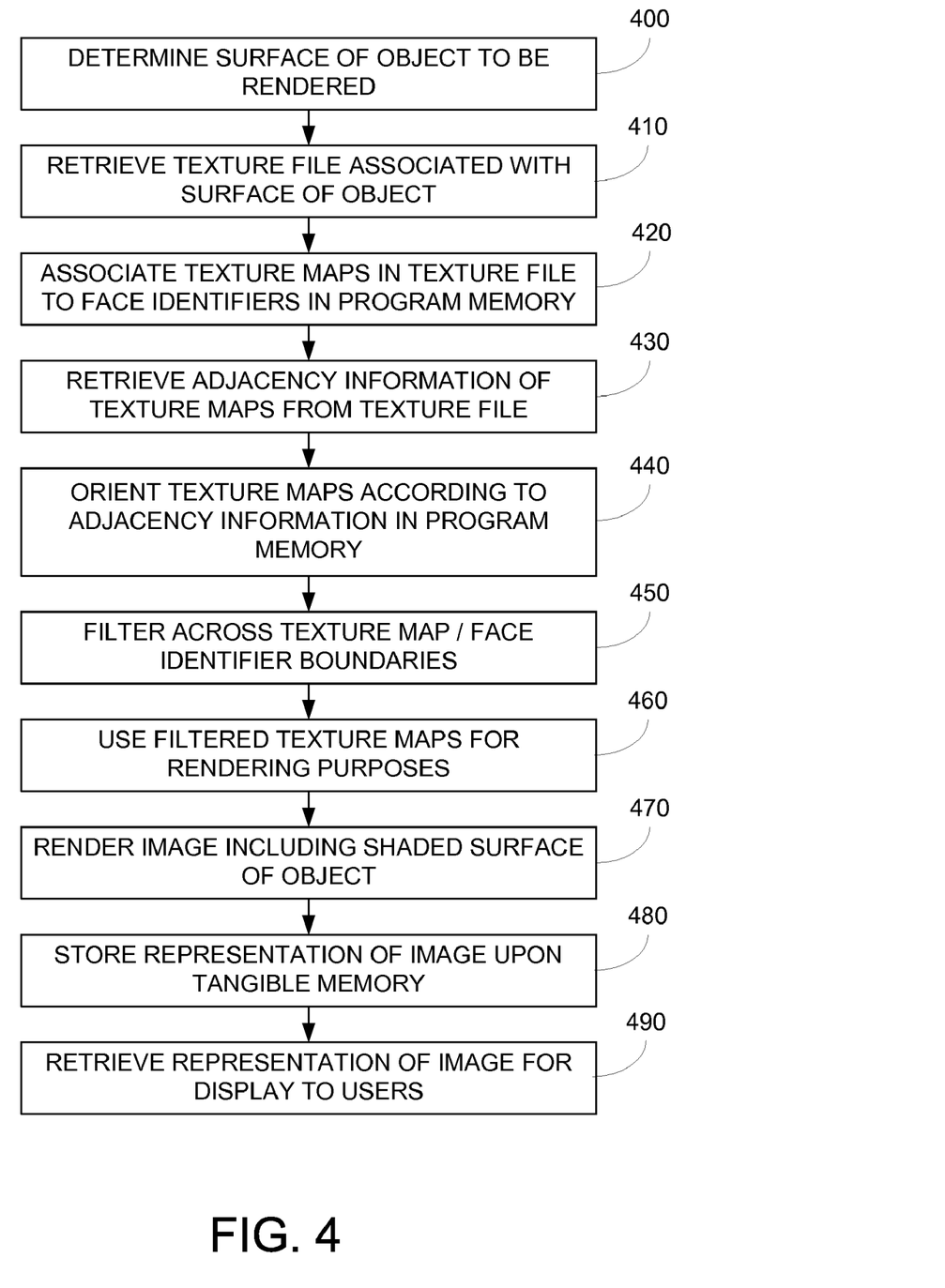
FIG. 4 illustrates a flow diagram according to various embodiments of the present invention.

FIG. 4 illustrates a flow diagram according to various embodiments of the present invention. More specifically, FIG. 4 illustrates the process of using a texture file described above. Initially, an object to be rendered is determined, step 400. Next, based upon the surface of the object that is to be rendered, an embodiment of a texture file, described above, may be retrieved from memory, step 410. In the embodiments described above, more than one texture map is typically stored in the texture file.

In various embodiments, texture maps are retrieved from the texture file based upon respective face identifiers, step 420. The adjacency information for each of the texture maps are also retrieved from the texture map, step 430. Next, the texture maps are oriented in memory according to the adjacency information, step 440. As discussed above, in various embodiments, because texture maps map directly to the surface of the object, the need to map from local coordinates (u, v) of the texture map to the surface coordinates (s, t) of the surface is greatly reduced, if not eliminated.

In various embodiments, filtering across boundaries of the adjacent texture maps is performed, step 450. Greater detail regarding filtering embodiments will be given below, and alternative filtering embodiments are described in the Ptex Paper. Subsequently, the filtered texture maps are used for rendering purposes, step 460. In some examples, the texture maps may specify surface parameters for rendering, e.g. roughness, smoothness, reflectivity, color, color patterning, and the like. In various examples, an image having a representation of the surface of part of the object may be rendered, step 470. The image may subsequently be stored on a tangible media, step 480, such as a hard disk, optical disk, optical media (e.g. film media), reflective media (e.g. paper), or the like. In various embodiments, one or more users may retrieve the image from a tangible media, and view the image, step 490. The users may include animators, engineers, consumers at a computer or a home theater, a theater audience, or the like.

In various embodiments of the present invention, a Mitchell Filter is used for texture filtering, described above. More specifically, the Mitchell Filter is a separable, piece-wise cubic filter using a kernel k(x) where the number of free parameters of the general cubic is reduced to two by imposing symmetry and C1 continuity constraints; for instance, k(x) can be defined as:

$$k(x) = (1/6)*(12 - 9B - 6C)|x|^3 + (-18 + 12B + 6C)|x|^2 + (6 - 2B), \text{ for } |x| < 1;$$

$$k(x) = (1/6)*(-B - 6C)|x|^3 + (6B + 30C)|x|^2 + (-12B - 48C)|x| + (8B + 24C), \text{ for } 1 \leq |x| < 2; \text{ and}$$

$$k(x) = 0, \text{ otherwise}.$$

In various embodiments, the filtering can further be constrained such that:

$$C = (1 - B)/2.$$

The filtering results may then range from soft to sharp. In some embodiments, the value B=⅓ is determined to be appropriate for general use. For convenience, in some examples a sharpness parameter is defined as sharpness=1−B.

In various embodiments, the data stored in the texture maps are considered in determining a value of B to use. In some examples, for displacement mapping texture maps, where smooth reflectance, the inventors have determined that B=1 is suitable; for color mapping or blend weighting texture maps, the inventors have determined that B<1 is suitable, giving an approximation of a low-pass filter.

FIG. 1B illustrates an example of artifacts determined according to various examples of a Mitchell filter. As can be seen in portion 120, a sample-frequency ripple noise or artifact can be seen. This noise was determined to have a period equal to the texture map spacing. The inventors have determined that the Mitchell filter described above produces little if any sample-frequency noise when the filter is an integral filter width, because the filter is separable and the kernel k has the following property for all x:

$$\sum_{n=-\infty}^{\infty} k(x - n) = 1$$

In various embodiments, the kernel is normalized to keep volume equal to 1.0 and to obtain a sufficient flat-field response. In various embodiments, to normalize the kernel, the weights are discretely normalized.

In various embodiments of the present invention, the Mitchell filter is applied to perform the texture filtering. In some embodiments of the present invention, each face includes a texture map, as well as a power of-two texture that is aligned with the shading grid. In some examples, a pre-filtered power-of two reductions can be stored in the texture file, described above or generated on demand (e.g. on the fly), from the nearest available resolution for the texture map.

In various embodiments, for a given filter region of size du×dv, the lowest pre-filtered texture resolution ($res_u$, $res_v$) is selected where the texels are no larger than the filter size:

$$res_u = 2^{\lceil log2(1/du) \rceil}; \quad res_v = 2^{\lceil log2(1/dv) \rceil},$$

where ⌈ ⌉ indicates the ceiling function.

In light of this, the filter width is typically between 1.0 and 2.0 texels, and the kernel requires approximately 4 to 8 samples in each direction.

In various embodiments, a grid of kernel values from the Mitchell equation are initially calculated. Next, when the kernel overlaps an edge of the face, the kernel is split and applied piecewise to each overlapped face.

In some embodiments, special blending methods are used for special cases such as an extraordinary vertex, if a neighboring face has insufficient resolution, or the like. If the main face has insufficient resolution for the selected filter resolution, filtering is performed upon the highest resolution texture map available.

In cases where there are filter transitions to different pre-filtered texture resolutions, a discontinuity may be introduced. In various embodiments to reduce such discontinuities, the neighborhood of the transition to the two nearest resolutions can be evaluated and blended in a manner similar to a RenderMan texture "lerp" option.

Figure 5A:
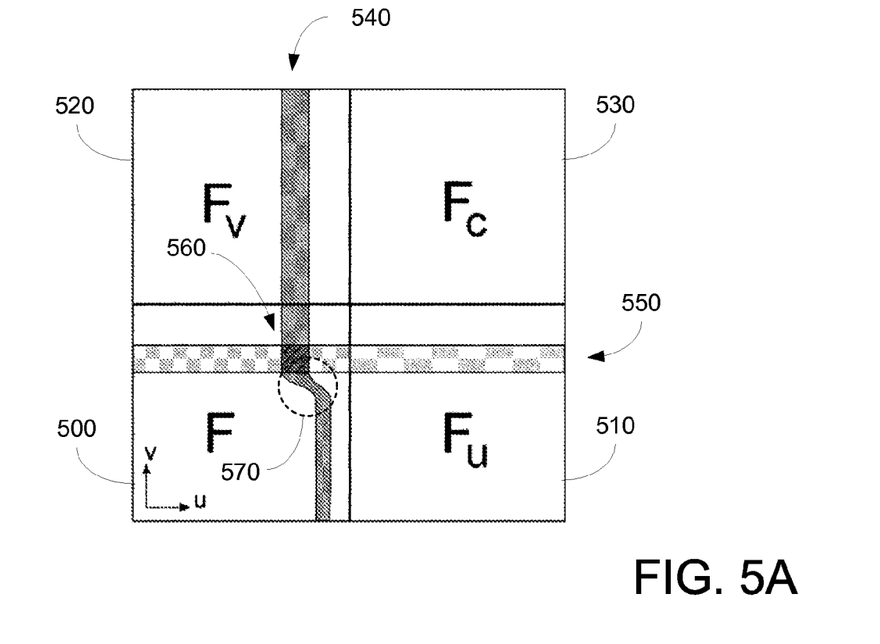
FIGS. 5A-B illustrate examples according to various embodiments of the present invention.

In various situations, the inventors have determined that modifications to the filtering process described above are desirable. One instance is when there is a resolution mismatch between adjacent face textures. FIG. 5A illustrates an example according to various embodiments of the present invention. More specifically, FIG. 5A illustrates textures 500, 510, 520 and 530 having different texture resolution.

In such an example, simply clamping the filter area to the local resolution can result in a discontinuity across the shared edge. Accordingly, in various embodiments, to eliminate the discontinuity, a blending operation is performed between two smooth surfaces: the surface reconstructed from the local face alone (which is continuous up to the edge) and the surface reconstructed from the highest common resolution of the two faces (which is continuous across the edge). In various embodiments, the blend region is defined to be approximately between 1.5 and 2.5 texels from the edge. More specifically, the distance of 1.5 texels is the point at which the local kernel would need the missing texels from the adjacent face in various embodiments. The blend region is defined to be 1 texel wide, which is determined to be a small and reasonable value given that the feature size of the local face is a texel in various embodiments. In other embodiments, larger blend widths can give visibly smoother results but at the cost of detail loss and increased expense.

In specific examples, a blending is performed using a $C^2$ smooth quintic step function, smoothstep(x), where:
smoothstep(x)=0 if x<0;
smoothstep(x)=1 if x>1; and
smoothstep(x)=$6x^5-15x^4+10x^3$ otherwise.

In various embodiments, filtering may be performed across either the u or v edges for some quadrant of the face. For example, between face 530 and 520, in region 540, between face 530 and 510, in region 550, and the like.

In other embodiments, filtering may be performed across both the u and v edges for some quadrant of the face, e.g. blended region 560, between face 500, face 510 and face 520. In such embodiments, region 540 and region 550 intersect at blended region 560, and a bi-directional smoothstep is used. In such cases, up to four separate surface textures may be required: one with the local resolution, one with the common u face resolution, one with the common v face resolution, and one with the highest common resolution of all four face textures.

In the example in FIG. 5A, since blend widths depend on the local resolution, they can be discontinuous across the edge. Accordingly, the blend widths must be smoothly blended, as illustrated by region 570. In various embodiments, the blended surface is everywhere smooth. However, the smoothstep may form a visible ridge along the edge in some cases, due to the difference in height between the B-spline approximation of the local high-resolution surface and the common low-resolution surface. In various embodiments, the ridge can be reduced by increasing the texture resolution, and/or using a larger blend width (up to half the face width less 1.5 texels).

In other embodiments, blending can also be avoided or reduced by either making all the faces the same resolution, or increasing the resolution to the point where sufficient resolution is available from the texture file.

Figure 5B:
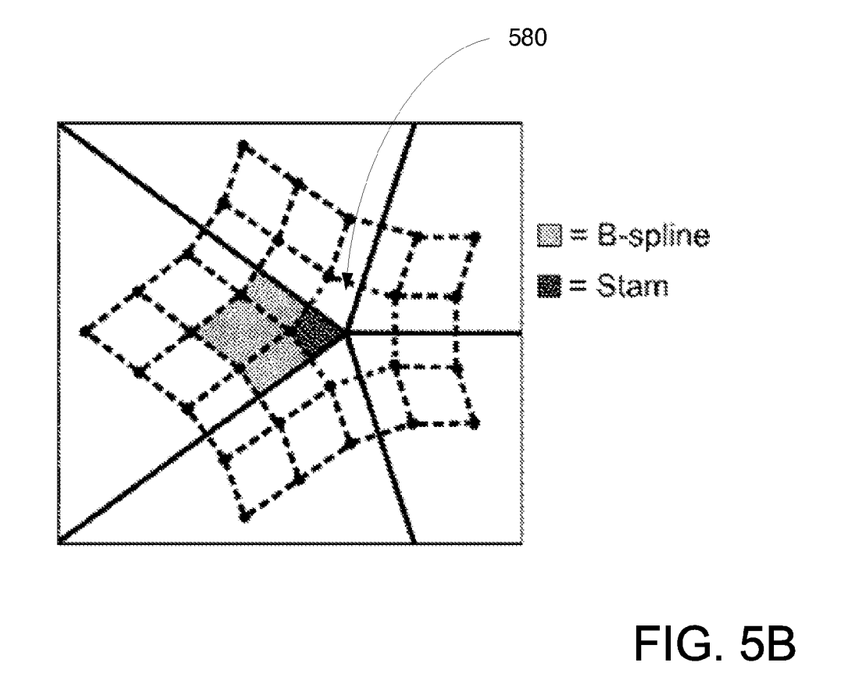

Another instance where modifications to the filtering process described may be desirable includes "extraordinary vertexes." FIG. 5B illustrates an example of an extraordinary vertex 580, where more than four faces intersect at a common point.

In some embodiments, if continuity at the edge is not important, for example when filtering color, then just ignoring the corner face may be acceptable. Additionally, for displacement filtering, the discontinuity is usually and not noticeable, if it is sub-pixel, such as when using a high resolution. However, for smooth B-spline displacement filtering with a low resolution texture, where the discontinuity projects to several pixels on screen, the discontinuity may be unacceptable.

In various embodiments, to address such situations, texels are treated as subdivision control points and evaluated using Stam's method [1998], known in the literature. Using Stam's method, the "control points" include of 9 texels from the current face, plus an additional 4N texels from the other faces surrounding vertex 580. Before evaluation, the texels are first subdivided. In various embodiments, after subdivision, the innermost 2N+8 texels are used for Stam's evaluation within 0:5 texel units of vertex 580 in both the u and v directions. Further, the remaining points are used for regular evaluation between 0:5 and 1:5 units, as discussed above.

Another instance where modifications may be desirable is in the case of larger filter widths. In such cases, aliasing is a concern, and increasing the number of samples is often impractical.

In various embodiments where a large filter width is used, a prefiltering method is used where a 1×1 (i.e. constant) per-face value is repeatedly blended by performing a box filtering operation onto neighbors. Subsequently a bilinear interpolation is performed between the blended values to determine the filtered samples.

In various embodiments, traditional three-dimensional paint packages are used to define texture maps. As described above, texture maps are packed into a single file for painting purposes. In various embodiments, the single file is then converted into the appropriate texture file format described above. One limitation to this approach, however, is that the texture resolution is typically restricted by the OpenGL limit, currently 4k by 4k.

In various embodiments, a proprietary paint application is used to natively support the texture file (Ptex). More specifically, each face is separately allocated in system memory with no packing. Separate texture maps are supported in OpenGL, but this is not currently practical as OpenGL driver performance often degrades with more than a few thousand textures. Accordingly, in some embodiments, texture maps are dynamically allocated into fixed sized "texture pages" corresponding to an OpenGL texture. Additional pages are added as needed to accommodate additional texture maps. In various embodiments, the resolution for each face is initially based on a user-specified texel density (i.e., texels per object-space unit). Faces, either individually or in groups, can then be selected by the user and their resolution can be increased or decreased as needed from a single pixel up to 4k by 4k per face.

In various embodiments, texture maps may be defined to represent displacement maps. In one specific embodiment, to generate displacement maps, a mesh from a sculpting application is input into a custom developed baking tool. In response to the mesh, vector displacements using parametric subdivision evaluation are determined.

In various embodiments, vector displacements require three channels. Since the detailed mesh was created by subdividing the base mesh N times and moving vertices, there is a simple parent-child correspondence between faces on the two meshes. Specifically, every face in the base mesh is the parent of $2^N \times 2^N$ child faces on the detailed mesh, and the ordering of child faces is deterministic. For each base face, a 3-channel floating point displacement texture is created having resolution $2^{N+1 \times 2N+1}$, so that each child face will be sampled 2×2 times. In various embodiments, at the (u, v) location for each texel, Stam's method [1998] may then be used to evaluate the base face and the corresponding child face. The difference of the two limit points is stored as a vector displacement.

In some embodiments, the texture file may be used to store baked procedurally shaded values. Per-face textures maps in the texture file provide an ideal format for baking such data, because the textures on each face are typically aligned with the shading grid. In various embodiments within a PRMan shader ("PRMan" refers to Pixar's Photorealistic Renderman software), a "bake3d" call is used to generate a point cloud file which can be read using PRMan's point cloud file API. In such examples, the texture file (Ptex) coordinate (faceid, u, v) is used in place of the usual 3d surface coordinate, P. Additionally, the resampling then takes place within the per-face texture space.

Embodiments of the present invention using an integrated texture file (Ptex file) can reduce the number of I/O calls required for rendering by up to a factor of 100 as compared to using multiple texture files per surface, making rendering more efficient. To the extent that rendering is I/O bound, the reduction in I/O calls can also improve overall rendering time. In some embodiments, render time may be further reduced due to the separable filter and dynamic anisotropic reductions.

Figure 6:
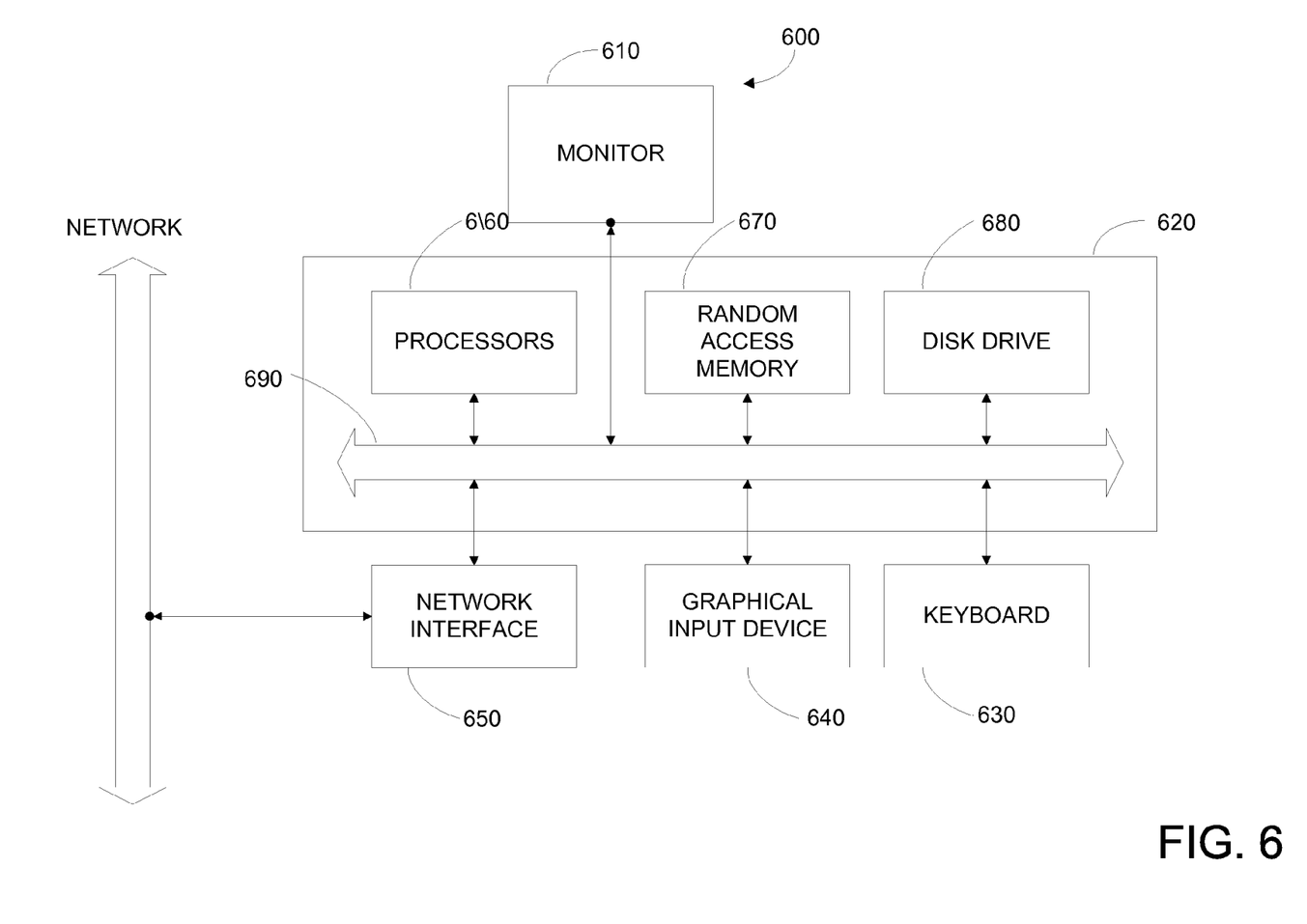
FIG. 6 is a block diagram of a typical computer system according to various embodiments of the present invention.

FIG. 6 is a block diagram of typical computer system 600 according to an embodiment of the present invention. In the present embodiment, computer system 600 typically includes a display 610, computer 620, a keyboard 630, a user input device 640, computer interfaces 650, and the like.

In various embodiments, display (monitor) 610 may be embodied as a CRT display, an LCD display, a plasma display, a direct-projection or rear-projection DLP, a microdisplay, or the like. In various embodiments, display 610 may be used to visually display user interfaces, images, or the like.

In various embodiments, user input device 640 is typically embodied as a computer mouse, a trackball, a track pad, a joystick, wireless remote, drawing tablet, voice command system, eye tracking system, and the like. User input device 640 typically allows a user to select objects, icons, text and the like that appear on the display 610 via a command such as a click of a button or the like.

Embodiments of computer interfaces 650 typically include an Ethernet card, a modem (telephone, satellite, cable, ISDN), (asynchronous) digital subscriber line (DSL) unit, FireWire interface, USB interface, and the like. For example, computer interfaces 650 may be coupled to a computer network, to a FireWire bus, or the like. In other embodiments, computer interfaces 650 may be physically integrated on the motherboard of computer 620, may be a software program, such as soft DSL, or the like.

In various embodiments, computer 620 typically includes familiar computer components such as a processor 660, and memory storage devices, such as a random access memory (RAM) 670, disk drives 680, and system bus 690 interconnecting the above components.

In some embodiments, computer 620 includes one or more Xeon microprocessors from Intel. Further, in the present embodiment, computer 620 typically includes a UNIX-based operating system.

RAM 670 and disk drive 680 are examples of computer-readable tangible media configured to store data such as geometrical descriptions of objects, texture maps, displacement maps, procedural shading maps, Ptex maps, embodiments for creating texture files, and using texture files for rendering purposes, a rendering engine, executable code providing functionality described above, or the like. Types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit, GPU, may be used to accelerate various operations, described below. Such operations may include determining performance style models, determining output performance data, or the like.

FIG. 6 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Core™ microprocessors from Intel; Phenom™, Turion™ 64, Opteron™ or Athlon™ microprocessors from Advanced Micro Devices, Inc; and the like. Further, other types of operating systems are contemplated, such as Windows-Vista®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In some embodiments, not all of the above computer components are required. Accordingly, many types of configurations for computational devices can be used to implement various methods described herein. Further, processing components having different levels of computational power, e.g. microprocessors (including RISC processors, embedded processors, or the like) can also be used to implement various embodiments.

In other embodiments of the present invention, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a memory, the method comprising:
receiving a data file comprising a plurality of texture maps including a first texture map and a second texture map and further comprising metadata, wherein the metadata includes identifiers associated with each of the plurality of texture maps and further includes adjacency data specifying topological adjacency relationships between different ones of the plurality of texture maps;
associating the first texture map with a first face of a plurality of faces of an object in the memory by reference to an identifier associated with the first texture map;
associating the second texture map with a second face of the plurality of faces of the object in the memory by reference to an identifier associated with the second texture map; and
performing a rendering operation with respect to the first face of the object to determine rendering data in response to the first texture map and to the second texture map, wherein performing the rendering operation includes determining, based on the adjacency data, that an edge of the first texture map is adjacent to an edge of the second texture map and applying a filter to a portion of the first texture map and a portion of the second texture map based on the adjacency data to determine rendering data for a portion of the first face that is near an edge of the first face.

2. The method of claim 1 wherein the first texture map includes data selected from a group consisting of: color data, displacement data, and shading data.

3. The method of claim 1 wherein a resolution of the first texture map and a resolution of the second texture map are different.

4. The method of claim 1 further comprising associating the first texture map with a third face of the plurality of faces of the object in the memory by reference to the identifier associated with the first texture map.

5. The method of claim 1 wherein each of the plurality of texture maps has a polygonal shape having a plurality of edges.

6. The method of claim 5 wherein the adjacency data includes, for each of the plurality of texture maps, an associated list of adjacent face identifiers and adjacent edge identifiers.

7. The method of claim 6 wherein the adjacency data for one of the plurality of texture maps includes a special value indicating that a first edge of the one of the plurality of texture maps is not adjacent to any other one of the plurality of texture maps.

8. The method of claim 5 wherein at least one of the texture maps has a quadrilateral shape.

9. The method of claim 5 wherein at least one of the texture maps has a triangular shape.

10. The method of claim 6 wherein
wherein at least one of the adjacent face identifiers associated with the first texture map is selected from a group consisting of: the identifier associated with the second texture map, the identifier associated with the first texture map, and an identifier not associated with any texture map.

11. The method of claim 1 wherein performing the rendering operation further includes applying the filter to a portion of the first texture map to determine rendering data for a portion of the first face that is not near an edge of the first face.

12. The method of claim 3 wherein applying the filter includes blending a portion of a surface reconstructed from the first texture map alone and a corresponding portion of a surface reconstructed from a highest common resolution version of the first texture map and the second texture map.

13. The method of claim 1 wherein performing the rendering operation further comprises:
detecting that the first face has an extraordinary vertex;
subdividing a plurality of texels near the extraordinary vertex; and
applying an evaluation to the subdivided texels to determine the rendering data for a portion of the surface near the extraordinary vertex.

14. The method of claim 1 wherein performing the rendering operation includes:
storing the first texture map from the data file into the memory; and
storing the second texture map from the data file into the memory, wherein the second texture map is rotated based on the adjacency data.

15. A computer system comprising:
a disk memory configured to store a data file comprising a plurality of texture maps including a first texture map and a second texture map and further comprising metadata, wherein the metadata includes identifiers associated with each of the plurality of texture maps and includes adjacency data specifying topological relationships between different ones of the plurality of texture maps;
a random access memory; and
a processor coupled to the disk memory and to the random access memory, wherein the processor is configured to determine an association of the first texture map with a first face of an object stored in the random access memory by reference to an identifier associated with the first texture map in the data file, wherein the processor is configured to determine an association of the second texture map with a second face of the object by reference to an identifier associated with the second texture map in the data file, and wherein the processor is configured to performing a rendering operation with respect to the one or more first surface locations and the one or more second surface locations on the object to determine rendering data in response to the first texture map and to the second texture map,
wherein performing the rendering operation includes determining, based on the adjacency data, that an edge of the first texture map is adjacent to an edge of the second texture map and applying a filter to a portion of the first texture map and a portion of the second texture map to determine rendering data for a portion of the first face that is adjacent to an edge of the first face.

16. The computer system of claim 15 wherein the first texture map includes data selected from a group consisting of: texture data, displacement data, and shading data.

17. The computer system of claim 15 wherein a resolution of the first texture map and a resolution of the second texture map are different.

18. The computer system of claim 15 wherein the processor is also configured to determine an association of the first texture map with a third face of the plurality of faces of the object by reference to the identifier associated with the first texture map.

19. The computer system of claim 15
wherein the processor is also configured to determine a desired resolution for the first texture map; and
wherein the processor is also configured to obtain a version of the first texture map having the desired resolution from the data file.

20. A method for a computer system, the method comprising:
receiving a plurality of texture maps;
receiving an object descriptor, the object descriptor defining a plurality of faces of an object and associating each of the faces with one of a plurality of face identifiers, wherein each face identifier is also associated with a texture map from the plurality of texture maps;
determining, based on the object descriptor including the associations of the faces with the plurality of face identifiers, texture adjacency data for the plurality of texture maps;
creating a single per-face texture file including the plurality of texture maps, the plurality of face identifiers, and the texture adjacency data; and
storing the per-face texture file in storage medium;
wherein the texture adjacency data specifies two or more texture maps from the plurality of texture maps that are adjacent and further specifies which edges of the two or more texture maps are adjacent.

21. The method of claim 20 further comprising:
determining a plurality of resolutions for a first texture map from the plurality of texture maps; and
wherein the per-face texture file includes versions of the first texture map at each of the plurality of resolutions.

22. The method of claim 20 wherein the first texture map includes data selected from a group consisting of: texture data, displacement data, and shading data.

23. The method of claim 20
wherein the plurality of texture maps includes a first texture map and a second texture map; and
wherein a resolution of the first texture map and a resolution of the second texture map are different.

24. The method of claim 20
wherein the plurality of texture maps includes a first texture map and a second texture map;
wherein the plurality of faces of the object includes a first face and a second face; and
wherein the first texture map is associated with both the first face and the second.

25. The method of claim 20 further comprising:
retrieving the per-face texture file from the storage medium; and
performing rendering operations in a scene including the object using the per-face texture file.

* * * * *